United States Patent
Tsai et al.

(10) Patent No.: US 8,983,212 B2
(45) Date of Patent: Mar. 17, 2015

(54) METHOD FOR IMAGE DATA COMPRESSION OF IMAGE BLOCK

(71) Applicant: ILI Technology Corporation, Jhubei (TW)

(72) Inventors: Ming-Yu Tsai, Kaohsiung (TW); Chien-Kuo Wang, Hsinchu (TW); Chen-Ting Kuan, Hsinchu County (TW)

(73) Assignee: ILI Technology Corporation, Jhubei (TW)

( * ) Notice: Subject to any disclaimer, the term of this patent is extended or adjusted under 35 U.S.C. 154(b) by 65 days.

(21) Appl. No.: 13/785,581

(22) Filed: Mar. 5, 2013

(65) Prior Publication Data

US 2013/0301940 A1 Nov. 14, 2013

(30) Foreign Application Priority Data

May 11, 2012 (TW) .............................. 101116893 A (51) Int. Cl.
*G06K 9/36* (2006.01)
*G06T 9/00* (2006.01)

(52) U.S. Cl.
CPC ........................................ *G06T 9/00* (2013.01)
USPC ........................................................ 382/232

(58) Field of Classification Search
CPC ............. G06T 9/00; G06T 9/008; G06T 9/20; H04N 19/00963; H04N 19/00951
USPC ................... 382/232, 251, 207, 162; 348/241
See application file for complete search history.

(56) References Cited

U.S. PATENT DOCUMENTS

| | | | | |
|---|---|---|---|---|
| 5,883,976 A * | 3/1999 | Ohsawa | ......................... | 382/232 |
| 6,289,118 B1 * | 9/2001 | Cossey | ........................ | 382/162 |
| 2009/0148059 A1 * | 6/2009 | Matsuda | ........................ | 382/251 |
| 2010/0259650 A1 * | 10/2010 | Sasaki | ........................ | 348/241 |
| 2011/0013844 A1 * | 1/2011 | Yamada | ........................ | 382/207 |
| 2012/0014597 A1 * | 1/2012 | Matsunaga | ................... | 382/166 |

* cited by examiner

*Primary Examiner* — Nirav G Patel
*Assistant Examiner* — Ian Lemieux
(74) *Attorney, Agent, or Firm* — Steptoe & Johnson LLP (57) ABSTRACT

A method for image data compression of a to-be-encoded image block includes: determining one of a plurality of preset encoding modes as an encoding mode based upon attributes of pixels of the to-be-encoded image block; and compressing image data of the to-be-encoded image block according to the encoding mode thus determined so as to obtain encoded data.

17 Claims, 11 Drawing Sheets

METHOD FOR IMAGE DATA COMPRESSION OF IMAGE BLOCK

CROSS-REFERENCE TO RELATED APPLICATION

This application claims priority to Taiwanese Application No. 101116893, filed on May 11, 2012.

BACKGROUND OF THE INVENTION

1. Field of the Invention

The invention relates to a method for data compression, and more particularly to a method for image data compression of an image block.

2. Description of the Related Art

Conventional image data compression may be classified into two compression techniques: RGB-to-YUV color space conversion coding and block truncation coding (BTC). An image is compressed using both of the two compression techniques, and the compression technique that results in less errors compared to the original image data is determined to be used, so that the compressed data that relatively saves hardware memory capacity may be accessed with high-speed through a static random access memory (SRAM).

Figure 1:
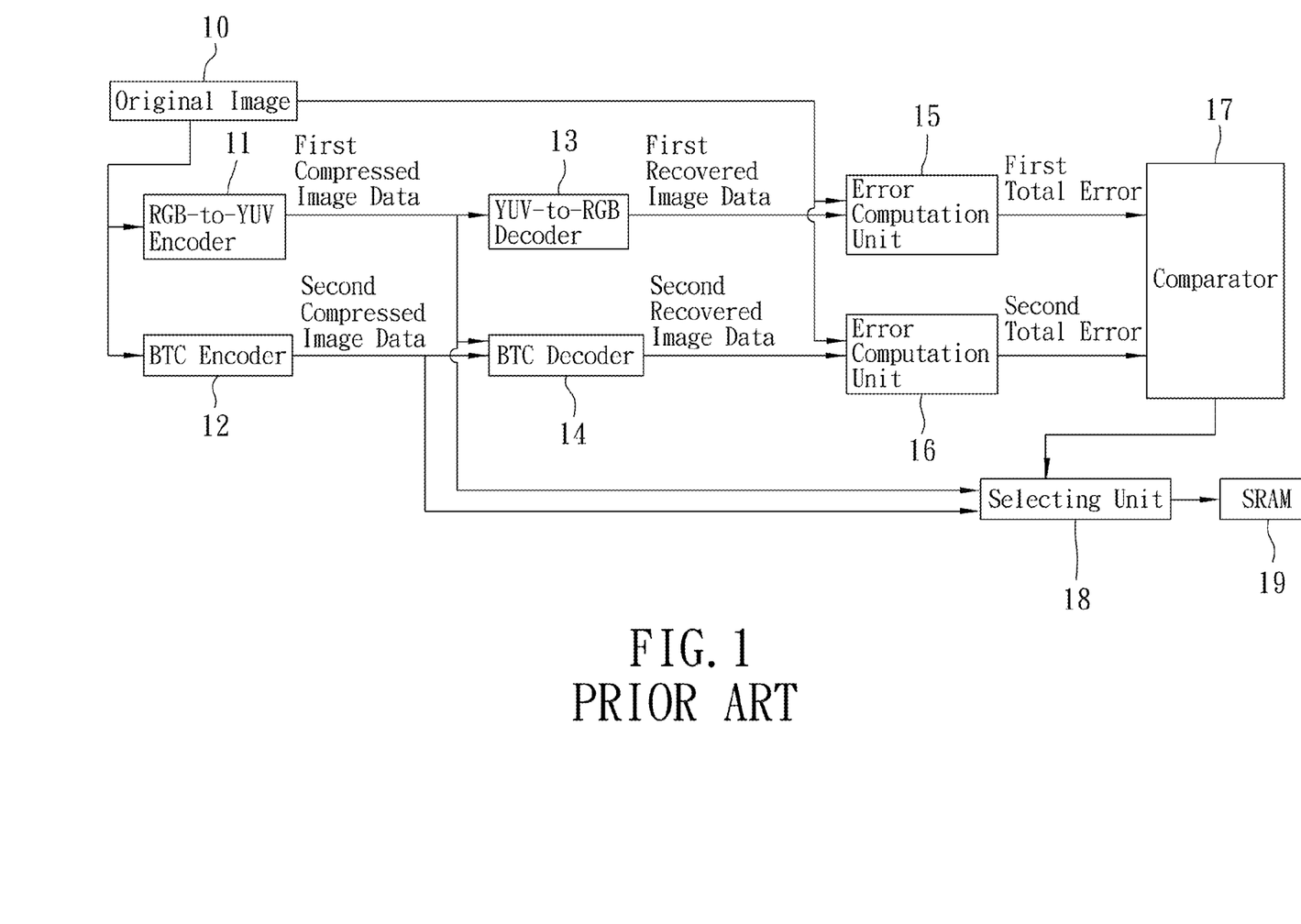
FIG. 1 is a block diagram showing architecture of a conventional method for image data compression.

Referring to FIG. 1, a conventional codec architecture for image compression includes an RGB-to-YUV encoder 11, a BTC encoder 12, a YUV-to-RGB decoder 13, a BTC decoder 14, a set of error computation units 15, 16, a comparator 17, and a selecting unit 18.

An original image 10 is compressed by the RGB-to-YUV encoder 11 and the BTC encoder 12 through parallel processing, so as to respectively obtain a first compressed image data corresponding to the RGB-to-YUV encoder 11 and a second compressed image data corresponding to the BTC encoder 12. Then, the first compressed image data is recovered by the YUV-to-RGB decoder 13 to obtain a first recovered image data, and the second compressed image data is recovered by the BTC decoder 14 to obtain a second recovered image data. The error computation unit 15 computes a first total error according to pixel errors between the first recovered image data and the original image data 10, and the error computation unit 16 computes a second total error according to pixel errors between the second recovered image data and the original image data 10. The first and second total errors are provided to the comparator 17, which then enables the selecting unit 18 to select one of the first and second compressed image data that corresponds to a smaller one of the first and second total errors for writing into SRAM 19.

In the aforementioned conventional method for image data compression, the original image data 10 is compressed using two compression techniques simultaneously, and the better one of the compression techniques is determined to be used according to the decompression results, resulting in more power consumption, additional commands, unnecessary decompression circuits, and waste of pipeline numbers and chip area.

SUMMARY OF THE INVENTION

Therefore, an object of the present invention is to provide a method for image data compression of a to-be-encoded image block that may alleviate the above drawbacks of the prior art.

According to one aspect of the present invention, a method for image data compression of a to-be-encoded image block comprises:

A) determining, using a pre-detection module, one of a plurality of preset encoding modes as an encoding mode based upon attributes of pixels of the to-be-encoded image block; and B) compressing, using a compression processing module, image data of the to-be-encoded image block according to the encoding mode determined in step A) so as to obtain encoded data.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
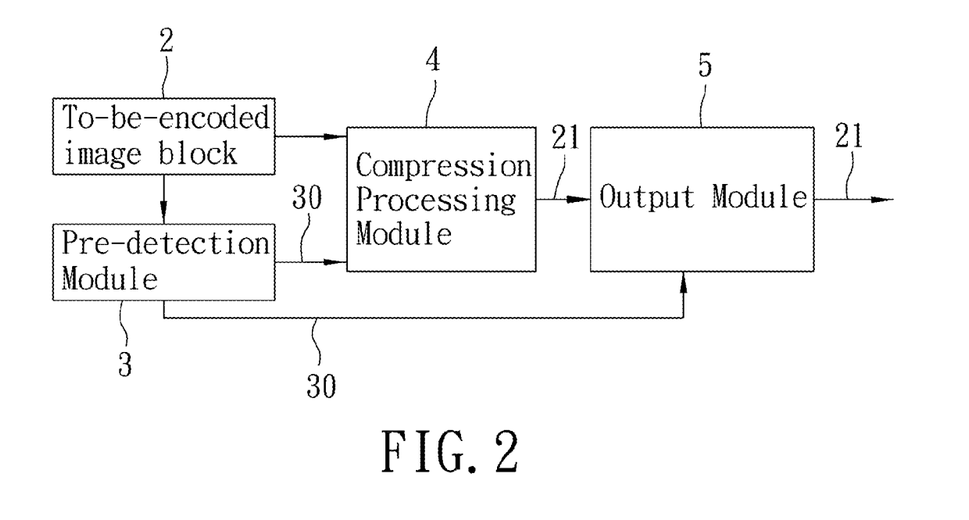
FIG. 2 is a block diagram showing a preferred embodiment of a system for image data compression of a to-be-encoded image block according to the present invention.
Figure 3:
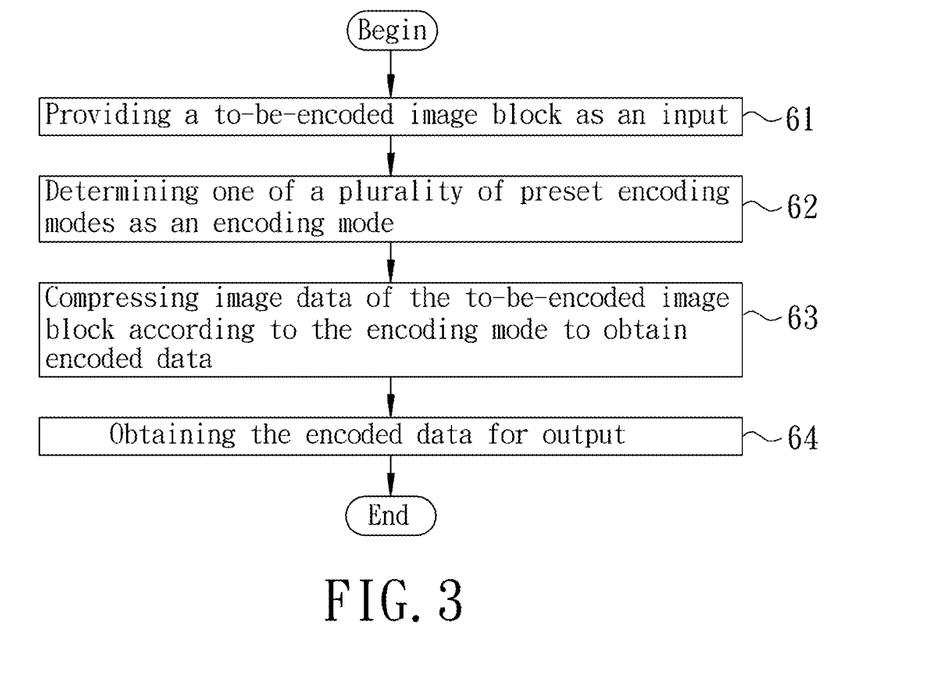
FIG. 3 is a flow chart illustrating steps of the preferred embodiment of the method for image data compression of the to-be-encoded image block according to the present invention.

Referring to FIG. 2 and FIG. 3, a preferred embodiment of the method for image data compression of a to-be-encoded image block 2 according to this invention is to be implemented by a system. The system includes a pre-detection module 3, a compression processing module 4, and an output module 5. The pre-detection module 3 is operable to determine a most suitable encoding mode for compression of the to-be-encoded image block 2.

In this embodiment, the to-be-encoded image block 2 is obtained by dividing an image frame into a plurality of non-overlapping and equally-sized image blocks, and serves as an input of the pre-detection module 3 and the compression processing module 4. Each of the image blocks has at least one image unit. Each image unit is composed of a number of pixels that is a power of 2, such as 2×2, 2×4, 4×4, or 4×8, etc. In this embodiment, the image frame is formed in an RGB666 format, and is divided into a plurality of 2×2 image blocks, so that each of the 2×2 image blocks has 72 data bits.

The preferred embodiment of the method for image data compression of the to-be-encoded image block 2 according to the present invention includes the following steps.

Step 61: The to-be-encoded image block 2 is provided as an input of the pre-detection module 3 and the compression processing module 4.

Step 62: The pre-detection module 3 determines one of a plurality of preset encoding modes as an encoding mode based upon attributes of pixels of the to-be-encoded image block 2.

Step 63: The compression processing module 4 compresses image data of the to-be-encoded image block 2 according to the encoding mode 30 determined in step 62 so as to obtain encoded data 21.

Step 64: The output module 5 obtains the encoded data 21 from the compression processing module 4 according to the encoding mode 30 for subsequent output.

The steps of the method described hereinabove provide a generalization of the method according to the present invention. Detailed operations of the pre-detection module 3 and the compression processing module 4 are described using the following two illustrative implementations hereinafter.

Figure 4:
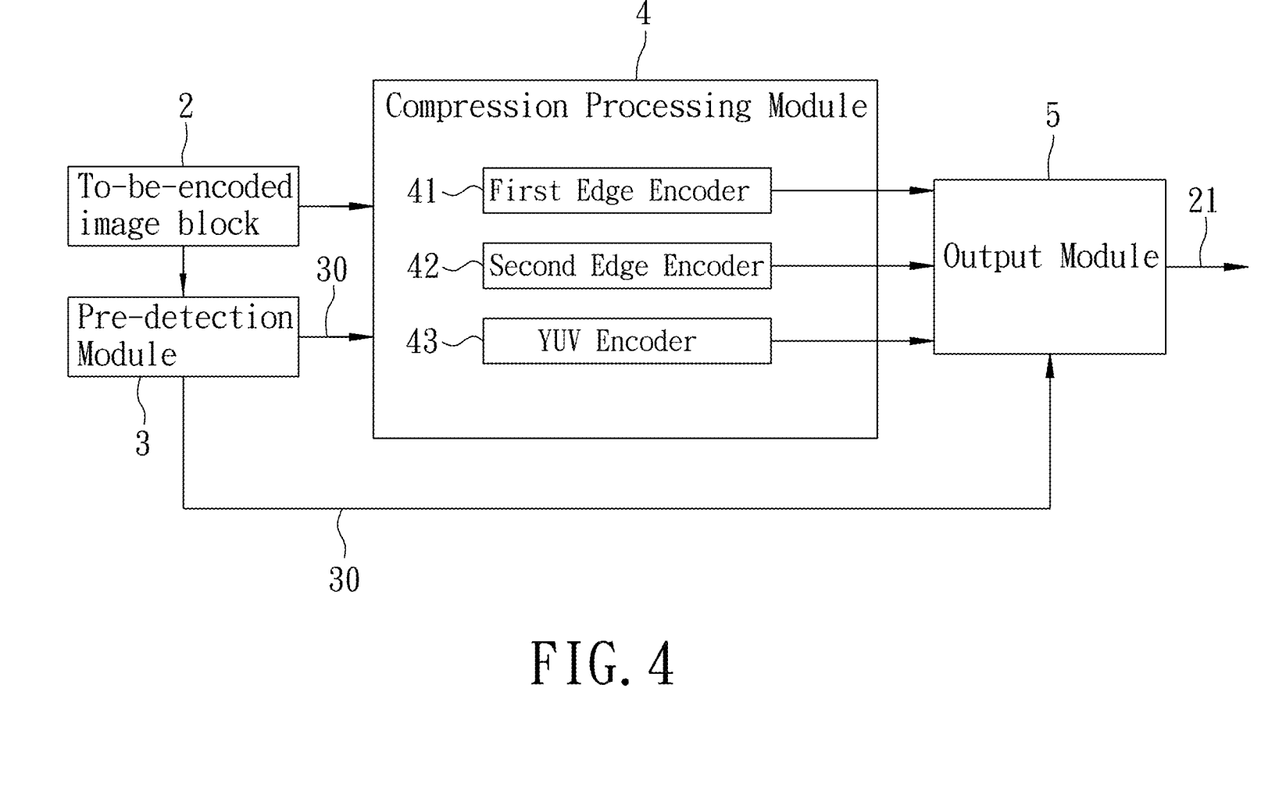
FIG. 4 is a block diagram showing a first implementation of the system of the preferred embodiment.
Figure 5:
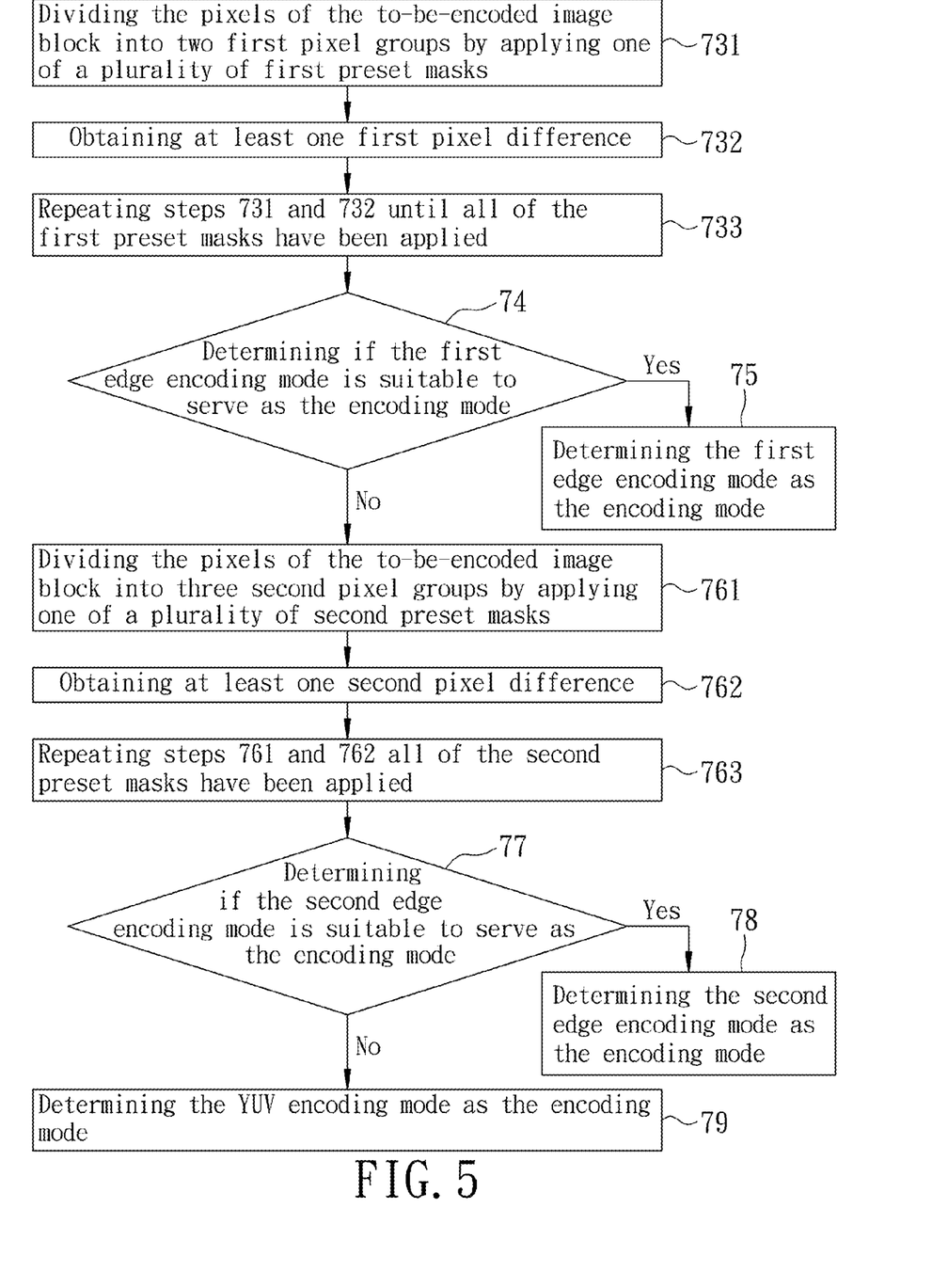
FIG. 5 is a flow chart illustrating steps applied using the first implementation of the method of the preferred embodiment.

Referring to FIG. 4 and FIG. 5 for a first implementation, the to-be-encoded image block 2 is a 2×2 block, and the preset encoding modes include a first edge encoding mode, a second edge encoding mode, and a YUV encoding mode. The compression processing module 4 includes a first edge encoder 41, a second edge encoder 42, and a YUV encoder 43 corresponding to the preset encoding modes, respectively.

Figure 8:
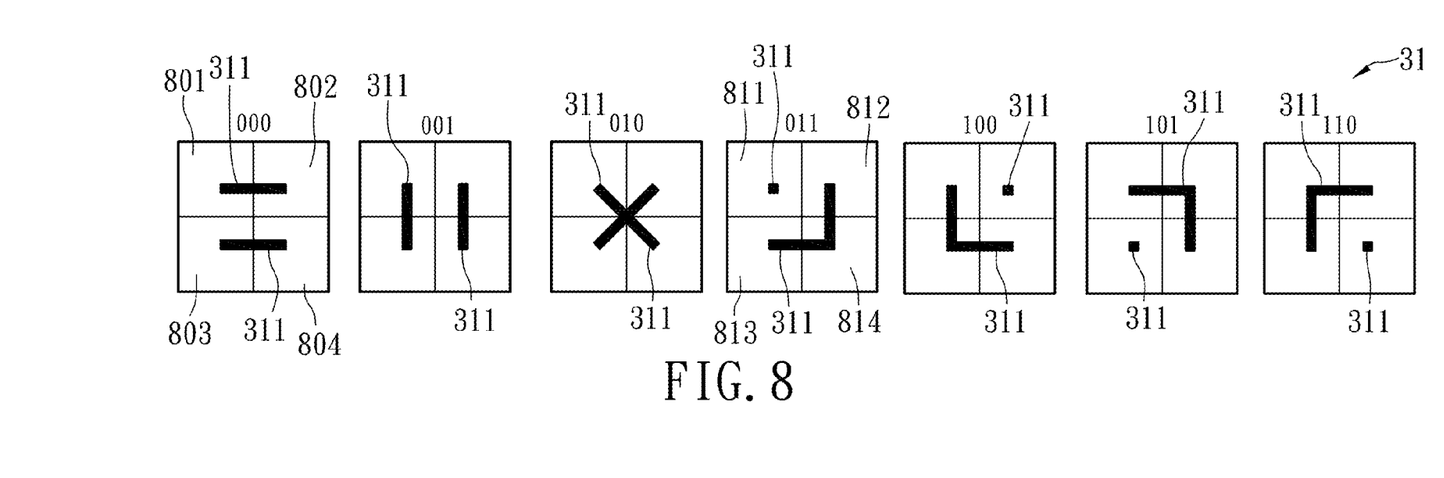
FIG. 8 is a schematic diagram showing a plurality of first preset masks of the preferred embodiment.

Referring to FIGS. 4, 5, and 8 for the first implementation, the pre-detection module 3 determines the encoding mode 30 from the first edge encoding mode, the second edge encoding mode, and the YUV encoding mode based upon attributes of pixels of the to-be-encoded image block 2 by applying the following steps.

Step 731: The pre-detection module 3 divides the pixels of the to-be-encoded image block 2 into two first pixel groups 311 by applying one of a plurality of first preset masks 31. Each of the first pixel groups 311 includes at least one of the pixels of the to-be-encoded image block 2. The first pixel groups 311 are denoted using bold lines or bold points in FIG. 8.

Using the leftmost one of the seven first preset masks 31 in FIG. 8 as an example, pixels 801, 802 form one of the first pixel groups 311, and pixels 803, 804 form the other first pixel group 311. Similarly, using the fourth first preset mask 31 from the left in FIG. 8 as an example, pixels 812, 813, 814 form one of the first pixel groups 311, and the pixel 811 alone forms the other first pixel group 311.

Step 732: The pre-detection module 3 obtains at least one first pixel difference by:

obtaining an average pixel value of the pixels for each of the first pixel groups 311 having at least two pixels;

calculating a first absolute difference between the average pixel value and each of the pixels for each of the first pixel groups 311 having at least two pixels; and obtaining the first pixel difference according to the first absolute differences obtained from each of the first pixel groups 311 having at least two pixels.

Using the leftmost first preset mask 31 in FIG. 8 as an example, the pre-detection module 3 obtains an average pixel value of the pixels 801, 802, which belong to the same first pixel group 311, and calculates first absolute differences between the average pixel value and the pixels 801, 802, respectively. A smaller one of the first absolute differences corresponding to one of the pixels 801, 802 is selected to serve as a first pixel difference corresponding to the first pixel group 311 having the pixels 801, 802. Similarly, the pre-detection module 3 obtains an average pixel value of the pixels 803, 804, which belong to the same first pixel group 311, and calculates first absolute differences between the average pixel value and the pixels 803, 804, respectively. A smaller one of the first absolute differences corresponding to one of the pixels 803, 804 is selected to serve as the other first pixel difference corresponding to the first pixel group 311 having the pixels 803, 804. That is, there are two first pixel differences corresponding to the leftmost first preset mask 31 in FIG. 8. Similarly, for the fourth first preset mask 31 from the left in FIG. 8, there is only one first pixel difference corresponding thereto since only the first pixel group 311 having the pixels 812, 813, 814 conforms with the condition of having at least two pixels.

In the first implementation, all of red component, green component, and blue component of each of the pixels of the to-be-encoded image block 2 in an RGB color space are used for calculation using one of the first preset masks 31. When the average pixel value of each first pixel group 311 is calculated, the red, green, and blue components of the first pixel group 311 are respectively averaged to obtain the average pixel value $(R_{AV}, G_{AV}, B_{AV})$. The first pixel difference is a sum of the pixel difference of the red components, the pixel difference of the green components, and the pixel difference of the blue components according to the definition of the first pixel difference.

Step 733: The pre-detection module 3 repeats steps 731 and 732 while applying another one of the first preset masks 31 until all of the first preset masks 31 have been applied.

Step 74: The pre-detection module 3 determines if the first edge encoding mode is suitable to serve as the encoding mode 30 based on the first pixel differences obtained in step 732. In detail, the first edge encoding mode is determined to be suitable to serve as the encoding mode 30 when each of the first pixel differences obtained in at least one of the repetitions of step 732 is not greater than a first threshold value. In the first implementation, the first threshold value is set to 7 in RGB666 format.

Step 75: The pre-detection module 3 determines the first edge encoding mode as the encoding mode 30 when it is determined that the first edge encoding mode is suitable to serve as the encoding mode 30 in step 74.

Figure 9:
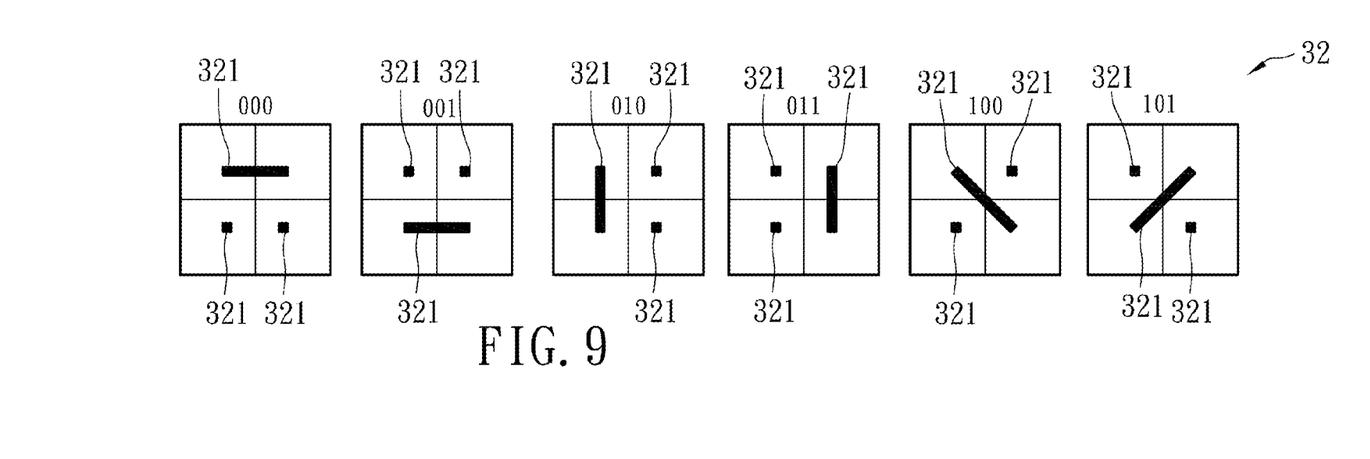
FIG. 9 is a schematic diagram showing a plurality of second preset masks of the preferred embodiment.

Referring to FIGS. 4, 5, and 9, the pre-detection module 3 determines if the second encoding mode is suitable to serve as the encoding mode 30 if it is determined in step 74 that the first encoding mode is unsuited to serve as the encoding mode 30.

Step 761: The pre-detection module 3 divides the pixels of the to-be-encoded image block 2 into three second pixel groups 321 by applying one of a plurality of second preset masks 32. Each of the second pixel groups 321 includes at least one of the pixels of the to-be-encoded image block 2. The practical implementation is similar to step 731, and is not repeated herein.

Step 762: The pre-detection module 3 obtains at least one second pixel difference by:

obtaining an average pixel value of the pixels for each of the second pixel groups 321 having at least two pixels;

calculating a second absolute difference between the average pixel value and each of the pixels for each of the second pixel groups 321 having at least two pixels; and obtaining the second pixel difference according to the second absolute differences obtained from each of the second pixel groups 321 having at least two pixels.

The practical implementation is similar to step 732, and is not repeated herein.

Similarly, all of red component, green component, and blue component of each of the pixels of the to-be-encoded image block 2 in the RGB color space are used for calculation using one of the second preset masks 32.

Step 763: The pre-detection module 3 repeats steps 761 and 762 while applying another one of the second preset masks 32 until all of the second preset masks 32 have been applied.

Step 77: The pre-detection module 3 determines if the second edge encoding mode is suitable to serve as the encoding mode 30 based on the second pixel differences obtained in step 762. In detail, the second edge encoding mode is determined to be suitable to serve as the encoding mode 30 when each of the second pixel differences obtained in at least one of the repetitions of step 762 is not greater than a second threshold value.

Step 78: The pre-detection module 3 determines the second edge encoding mode as the encoding mode 30 when it is determined that the second edge encoding mode is suitable to serve as the encoding mode 30 in step 77.

Step 79: The pre-detection module 3 determines the YUV encoding mode as the encoding mode 30 if it is determined in step 77 that the second encoding mode is unsuited to serve as the encoding mode 30.

Referring to FIG. 4, in the first implementation, the compression processing module 4 compresses the image data of the to-be-encoded image block 2 according to the encoding mode 30 determined by the pre-detection module 3 so as to obtain the encoded data 21 using the following steps.

When the encoding mode 30 is determined to be the first edge encoding mode, the first edge encoder 41 encodes one of the first preset masks 31 into a first encoding index. The one of the first preset masks 31 conforms with a first mask condition, in that the first pixel differences associated therewith and obtained in one of the repetitions of step 732 are not greater than the first threshold value, and has a smallest one of the first pixel differences relative to other ones of the first preset masks 31 that conform with the first mask condition. The first edge encoder 41 compresses the first pixel groups 311 that are divided from the to-be-encoded image block 2 by applying the one of the first preset masks 31 associated with the first encoding index so as to obtain the encoded data 21.

Referring to FIG. 8, both of the leftmost first preset mask 31 and the fourth first preset mask 31 from the left are assumed to conform with the first mask condition. In a situation of using the leftmost first preset mask 31, the smaller first pixel difference of the first pixel group 311 that has the pixels 801 and 802 is assumed to be 3, and the smaller first pixel difference of the first pixel group 311 that has the pixels 803 and 804 is assumed to be 4. In a situation of using the fourth first preset mask 31 from the left, the smaller first pixel difference of the first pixel group 311 that has the pixels 812, 813, and 814 is assumed to be 2. The first edge encoder 41 determines the first preset edge mask 31 that corresponds to the smallest first pixel difference from the first preset edge masks 31 that conform with the first mask condition for encoding. That is, the fourth first preset mask 31 from the left is determined to be used for encoding, and the corresponding first encoding index is presented using three binary bits "011". In this implementation, the corresponding first encoding indices of the first preset masks 31, from left to right, are respectively presented using "000", "001", "010", "011", "100", "101", and "110", as the binary numbers shown above the first preset masks 31 in FIG. 8.

It should be noted that, as shown in the following Table 1 as an example, the to-be-encoded image block 2 is divided into the first pixel groups A, B corresponding to the fourth first preset mask 31 from the left in FIG. 8, and values of the red (R), green (G), and blue (B) components of each of the first pixel groups A, B are respectively obtained from average values of the R, G, B components of the pixels thereof. The first edge encoder 41 selects one of the first pixel groups A, B to preserve the complete data bits of the average pixel values thereof, and preserves the leftmost four, five, and five bits of the respective R, G, B components, and discards the rightmost 1 to 2 data bits of the R, G, B components of the other one of the first pixel groups A, B for compression. The mode selection code is encoded as "0" in this example.

To sum the bit number as shown in Table 1, using a 2×2 to-be-encoded image block 2 which has 72 bits as an example, the compression rate is ½. That is, the encoded data 21 has 36 bits after data compression.

TABLE 1

| | Mode selection code | Encoding Index | First Pixel Group A | | | First Pixel Group B | | |
|---|---|---|---|---|---|---|---|---|
| | | | R | G | B | R | G | B |
| Bit no. | 1 | 3 | 6 | 6 | 6 | 4 | 5 | 5 |

Referring to FIGS. 4 and 9, when the encoding mode 30 is determined to be the second edge encoding mode, the second edge encoder 42 encodes one of the second preset masks 32 into a second encoding index. The one of the second preset masks 32 conforms with a second mask condition, in that the second pixel differences associated therewith and obtained in one of the repetitions of step 762 are not greater than the second threshold value, and has a smallest one of the second pixel differences relative to other ones of the second preset masks 31 that conform with the second mask condition. The second edge encoder 42 compresses the second pixel groups 321 that are divided from the to-be-encoded image block 2 by applying the one of the second preset masks 32 associated with the second encoding index so as to obtain the encoded data 21. The calculation and the processing are similar to those when the encoding mode 30 is determined to be the first edge encoding mode, and are not detailed hereinafter.

Referring to Table 2 for another example, the mode selection code occupies two bits, and is encoded using "10". The corresponding second encoding indices of the second preset masks 32, from the left to right, are respectively presented using "000" to "101", as the binary numbers shown above the second preset masks 32 in FIG. 9. The second edge encoder 42 determines the most suitable second preset mask 32 from the six second preset masks 32, and adopts the corresponding second encoding index. It is known from Table 2 that the R, G, B components of the second pixel groups A, B, C respectively have 3 to 4 bits. The second edge encoder 42 respectively discards the rightmost 2 to 3 bits of the R, G, B components of the second pixel groups A, B, C for compression.

To sum the bit number as shown in Table 2, using a 2×2 to-be-encoded image block 2 which has 72 bits as an example, the compression rate is ½. That is, the encoded data 21 has 36 bits after data compression.

TABLE 2

| | Mode selection code | Encoding Index | Second pixel group A | | | Second pixel group B | | | Second pixel group C | | |
|---|---|---|---|---|---|---|---|---|---|---|---|
| | | | R | G | B | R | G | B | R | G | B |
| Bit no. | 2 | 3 | 4 | 4 | 4 | 3 | 4 | 3 | 3 | 3 | 3 |

When the encoding mode 30 is determined to be the YUV encoding mode, the YUV encoder 43 compresses the to-be-encoded image block 2 into the encoded data 21. The YUV encoding is not detailed hereinafter since it is readily appreciated by persons having ordinary skill in the art.

Figure 6:
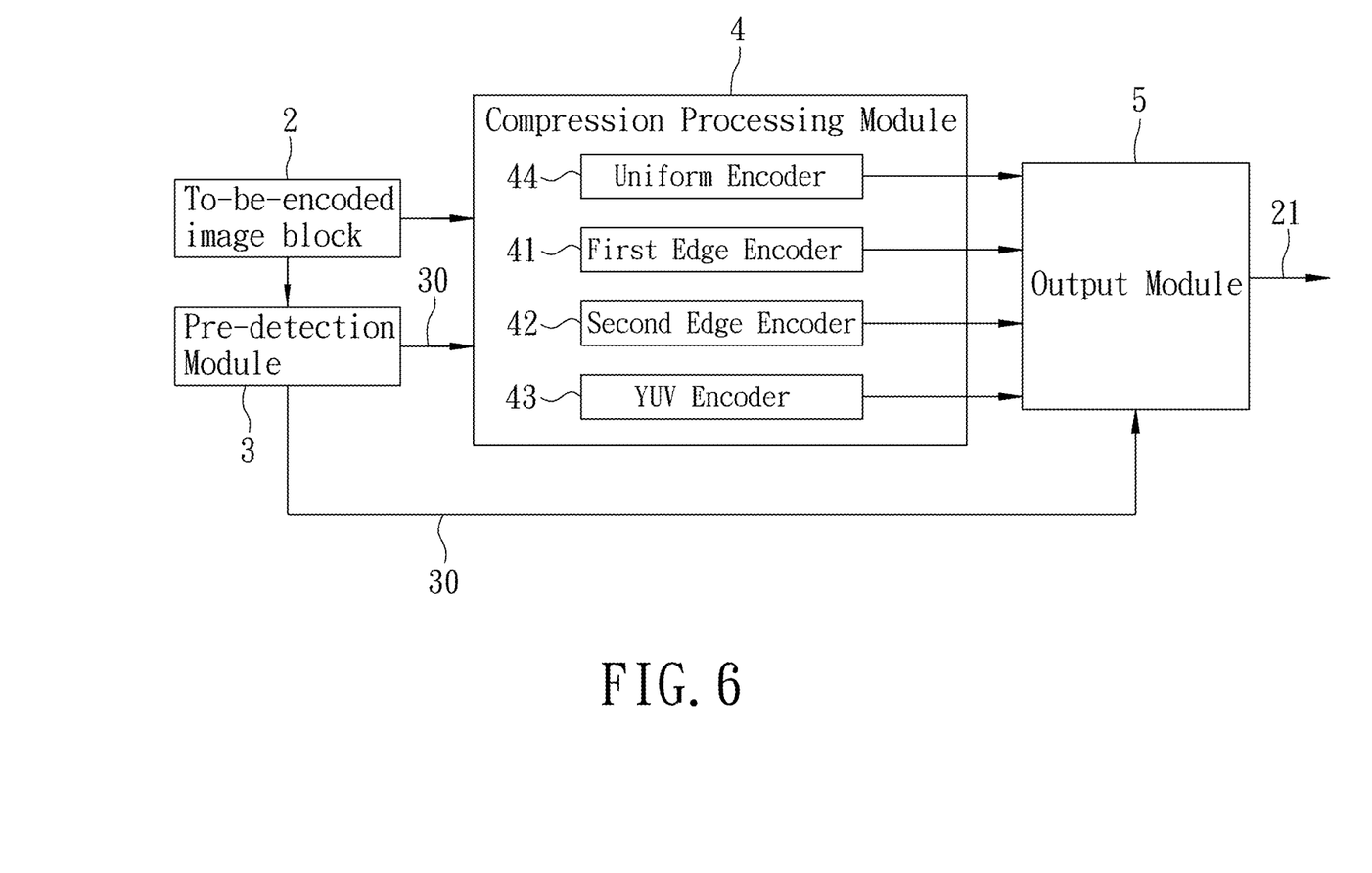
FIG. 6 is a block diagram showing a second implementation of the system of the preferred embodiment.
Figure 7A:
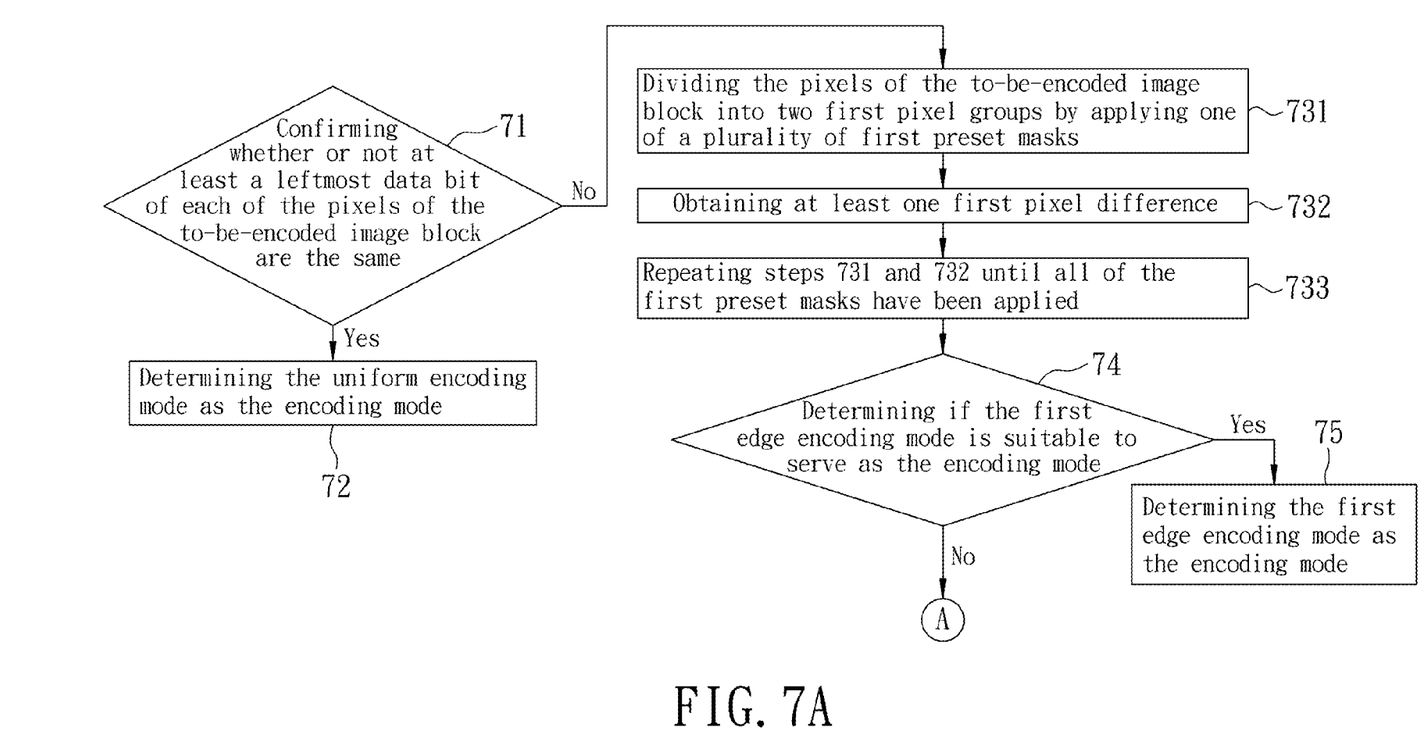
FIGS. 7A and 7B are a flowchart illustrating steps applied using the second implementation of the method of the preferred embodiment.
Figure 7B:
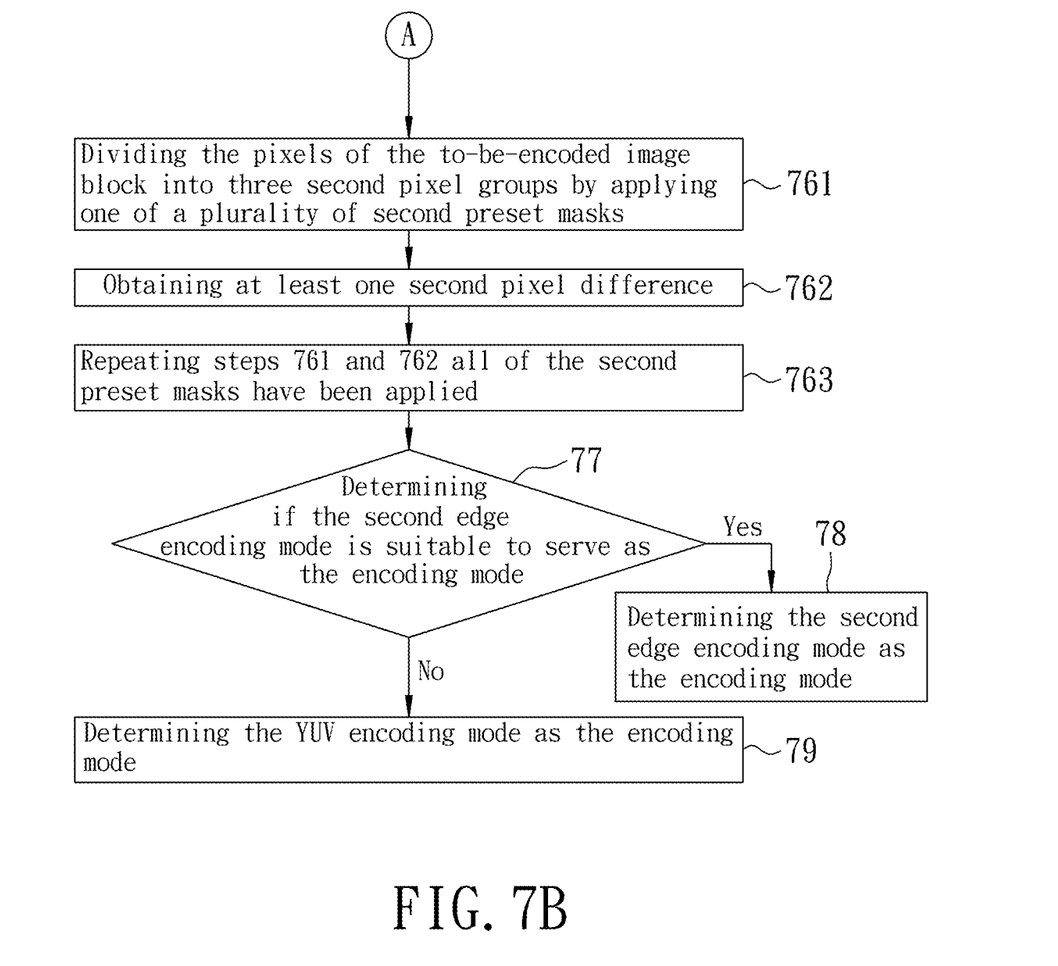

Referring to FIGS. 6, 7A and 7B for a second implementation, the to-be-encoded image block 2 is a 2×2 image block, and the preset encoding modes further include a uniform encoding mode in addition to the preset encoding modes described in the first implementation. The compression processing module 4 further includes a uniform encoder 44 in addition to the first edge encoder 41, the second edge encoder 42, and the YUV encoder 43 described in connection with the first implementation.

The second implementation of the method of this invention includes the following steps.

Step 71: The pre-detection module 3 confirms whether or not at least a leftmost data bit of each of the pixels of the to-be-encoded image block 2 are the same.

In the second implementation, the pre-detection module 3 confirms whether or not at least four leftmost data bits of each of the pixels of the to-be-encoded image block 2 are the same.

Step 72: The pre-detection module 3 determines the uniform encoding mode as the encoding mode 30 when the confirmation made in step 71 is affirmative. Otherwise, the pre-detection module 3 performs step 731.

In the second implementation, steps 731, 732, 733, 74, 75, 761, 762, 763, 77, 78, and 79 are the same as those described in the first implementation, and are not repeated herein.

Referring to FIG. 6, in the second implementation, the compression processing module 4 compresses the image data of the to-be-encoded image block 2 according to the encoding mode 30 determined by the pre-detection module 3 so as to obtain the encoded data 21 by execution of the following steps.

When the encoding mode 30 is determined to be the uniform encoding mode, the uniform encoder 44 preserves complete data of one of the pixels of the to-be-encoded image block 2, preserves at least one bit next to said at least the leftmost data bit for each of the other pixels of the to-be-encoded image block 2, and compresses non-preserved data bits for each of the other pixels of the to-be-encoded image block 2.

In the second implementation, the uniform encoder 44 preserves complete data of one of the four pixels of the to-be-encoded image block 2, discards leftmost four bits of the other three pixels, and preserves at least one bit next to the leftmost four bits thereof for compression. Referring to the following Table 3, except for the pixel A, 1 or 2 bits are preserved for the other pixels. Since the four discarded bits of the pixels B, C, D are the same as the leftmost four bits of the pixel A, the recovered data bits of the pixels B, C, D only have a maximum error of 1 bit for each of the R, G, B components. Therefore, when data of the pixels of the to-be-encoded image block 2 are close to each other, the uniform encoding mode may result in better performance in terms of color gradient. For the uniform encoding mode, the mode selection code occupies one bit of the code "0", and the encoding index occupies three bits of the code "111".

To sum the bit number as shown in Table 3, using a 2×2 to-be-encoded image block 2 which has 72 bits as an example, the compression rate is ½. That is, the encoded data 21 has 36 bits after data compression.

TABLE 3

| | Mode selection code | Encoding index | Pixel A | | | Pixel B | | | Pixel C | | | Pixel D | | |
|---|---|---|---|---|---|---|---|---|---|---|---|---|---|---|
| | | | R | G | B | R | G | B | R | G | B | R | G | B |
| Bit no. | 1 | 3 | 6 | 6 | 6 | 1 | 2 | 2 | 2 | 2 | 2 | 1 | 1 | 1 |

In the second implementation, when the encoding mode 30 is determined to be the first edge encoding mode or the second edge encoding mode, the steps of data compression performed by the compression processing module 4 are the same as those described in the first implementation, and thus are not repeated herein.

Referring to FIGS. 10 to 13, in addition to the aforesaid first and second illustrative implementations, the to-be-encoded image block 2 may be a 2×4 image block in other implementations. Therefore, the preset masks may be selected from third preset masks 33 shown in FIGS. 10 to 13.

Figure 10:
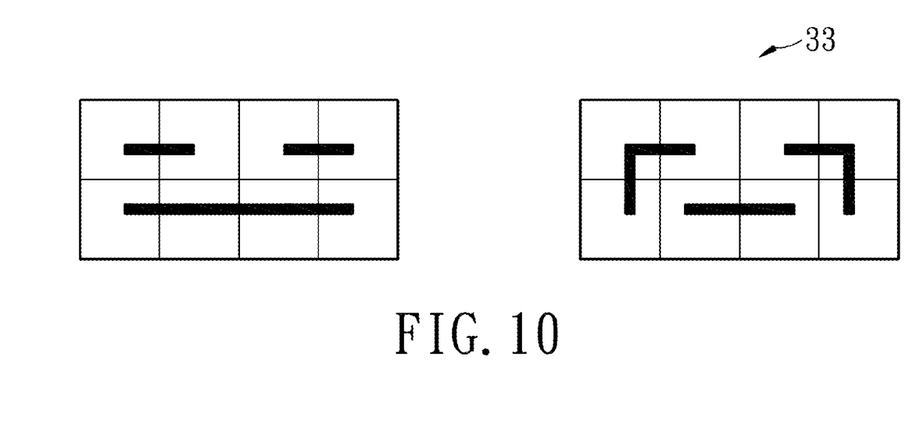
FIGS. 10 to 13 are schematic diagrams showing a plurality of third preset masks of modifications of the preferred embodiment.
Figure 11:
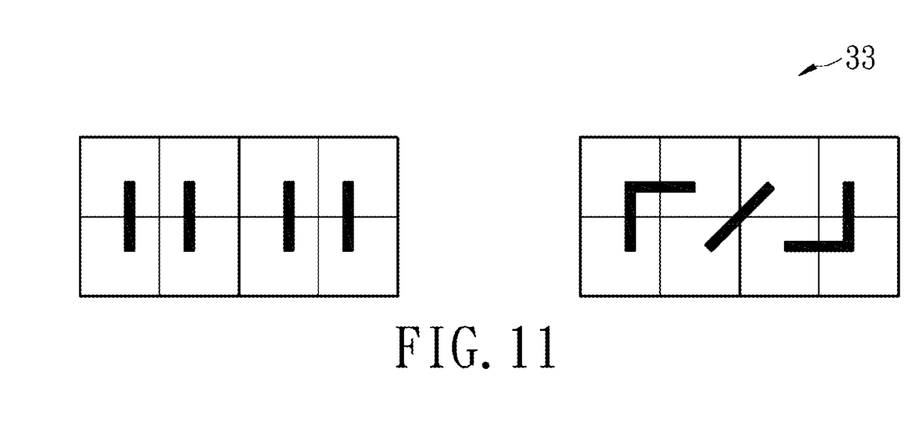
Figure 12:
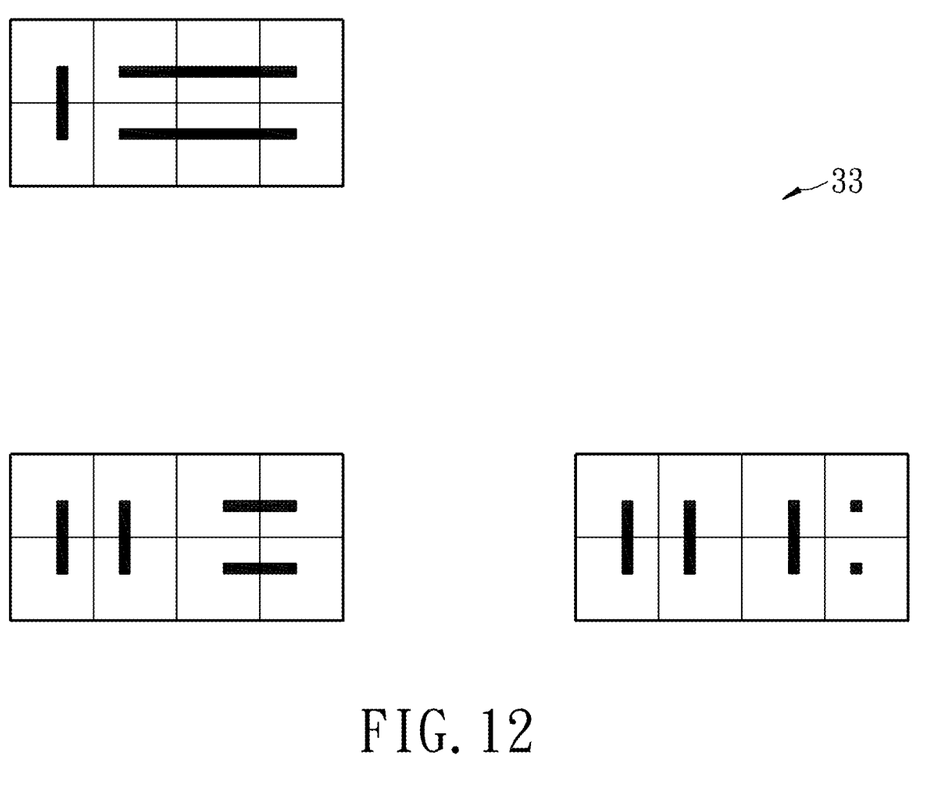
Figure 13:
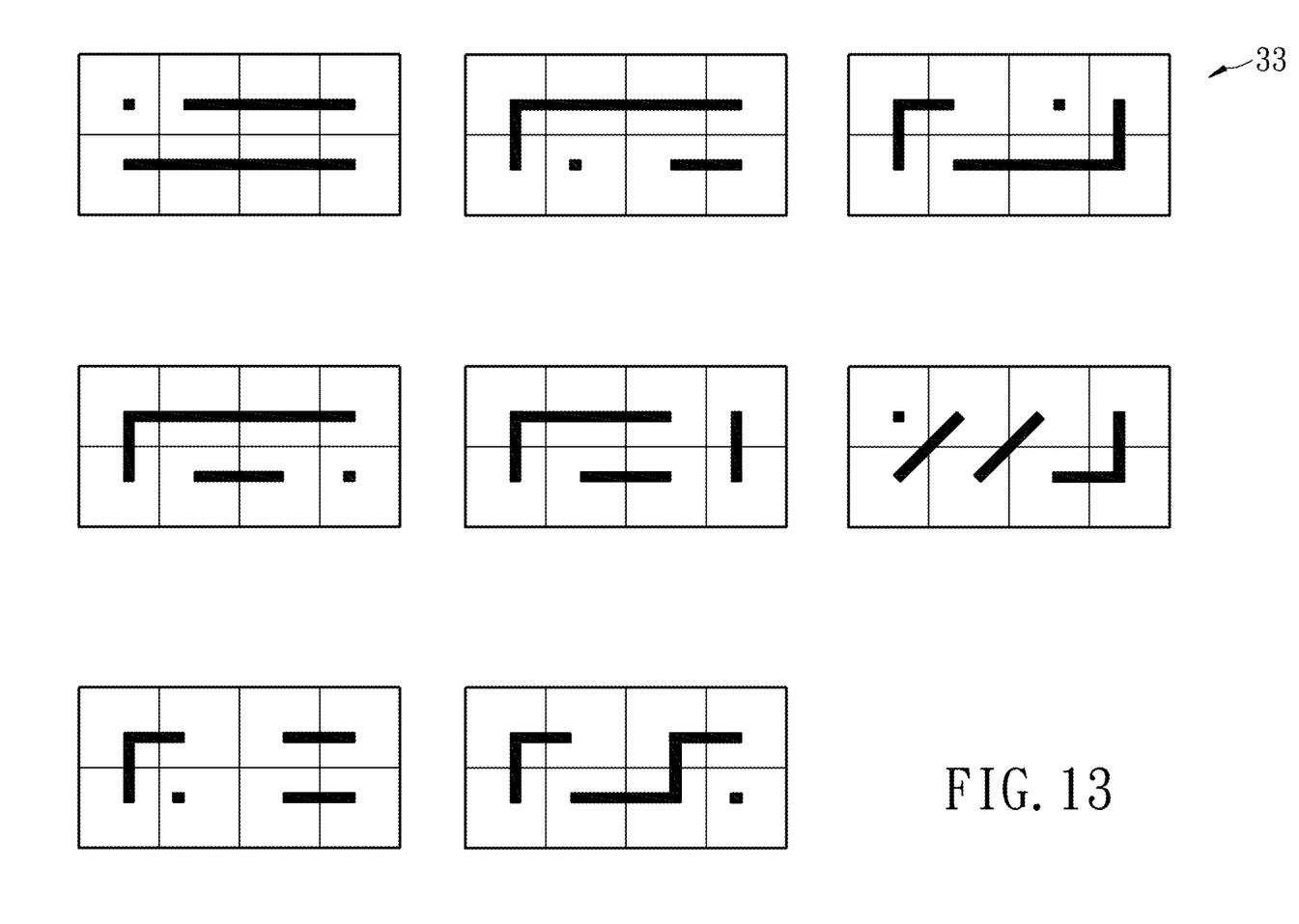

The third preset masks 33 shown in FIG. 10 may be implemented in an upside down manner, so there are actually 2×2=4 third preset masks 33 proposed in FIG. 10. Similarly, the third preset masks 33 shown in FIG. 12 may be implemented in a mirror image manner, so there are actually 3×2=6 third preset masks 33 proposed in FIG. 12. Likewise, the third preset masks 33 shown in FIG. 13 may be implemented in an upside down manner, a mirror image manner, or both, so there are actually 8×4=32 third preset masks 33 proposed in FIG. 13. The implementation of encoding the 2×4 to-be-encoded image block 2 is similar to that described in connection with the first and second implementations, and is not detailed hereinafter.

In other preferred embodiments, the image frame is not limited to the RGB666 format, and may be an RGB888 format. When the format of the image frame is RGB888, a 2×2 to-be-encoded image block 2 has 96 data bits. By using one of the first edge encoding mode, the second edge encoding mode, the uniform encoding mode, and the conventional YUV encoding mode for data compression, the compression rate can also reach ½. That is, the encoded data will have 48 bits after data compression. The practical details of encoding are not detailed hereinafter since they are similar to those described in connection with the first and second implementations for the RGB666 format, and should be readily appreciated by persons having ordinary skill in the art in light of the disclosure provided herein.

To sum up, the method for image data compression of a to-be-encoded image block 2 effectively determines the encoding mode 30 from several preset encoding modes through determining mechanisms performed by the pre-detection module 3, and compresses data of the to-be-encoded image block 2 using a single determined encoding mode 30 through the compression processing module 4. During data compression, the to-be-encoded image block 2 is not required to be compressed and decompressed using several different encoding modes at the same time for determining the most suitable encoding mode 30, thereby reducing power consumption during data compression, and reducing chip area by eliminating the decompression circuit.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for image data compression of a to-be-encoded image block, comprising:
   A) determining, using a pre-detection module, one of a plurality of preset encoding modes as an encoding mode based upon attributes of pixels of the to-be-encoded image block; and
   B) compressing, using a compression processing module, image data of the to-be-encoded image block according to the encoding mode determined in step A) so as to obtain encoded data;
   wherein:
   in step A), the preset encoding modes include a first encoding mode and a second encoding mode, said step A) including:
      A1) determining if the first encoding mode is suitable to serve as the encoding mode; and
      A2) determining if the second encoding mode is suitable to serve as the encoding mode if it is determined in sub-step A1) that the first encoding mode is unsuited to serve as the encoding mode; and
   one of the first encoding mode and the second encoding mode is a first edge encoding mode, and one of sub-steps A1) and A2) corresponding to the first edge encoding mode includes:
      a-1) dividing the pixels of the to-be-encoded image block into two first pixel groups by applying one of a plurality of first preset masks, each of the first pixel groups including at least one of the pixels of the to-be-encoded image block;
      a-2) obtaining at least one first pixel difference by:
         obtaining an average pixel value of the pixels for each of the first pixel groups having at least two pixels;
         calculating a first absolute difference between the average pixel value and each of the pixels for each of the first pixel groups having at least two pixels; and
         obtaining the first pixel difference according to the first absolute differences obtained from each of the first pixel groups having at least two pixels;
      a-3) repeating sub-steps a-1) and a-2) while applying another one of the first preset masks until all of the first preset masks have been applied; and
      a-4) determining if the first edge encoding mode is suitable to serve as the encoding mode based on the first pixel differences obtained in sub-step a-2).

2. The method as claimed in claim 1, wherein, in step A), the preset encoding modes further include a third encoding mode, said step A) further including
   A3) determining if the third encoding mode is suitable to serve as the encoding mode if it is determined in sub-step A2) that the second encoding mode is unsuited to serve as the encoding mode.

3. The method as claimed in claim 2, wherein one of the second and third encoding modes is a YUV encoding mode.

4. The method as claimed in claim 1, wherein, in sub-step a-4), the first edge encoding mode is determined to be suitable to serve as the encoding mode when each of the first pixel differences obtained in at least one of the repetitions of sub-step a-2) is not greater than a first threshold value.

5. The method as claimed in claim 4, wherein, when the encoding mode determined in step A) is the first edge encoding mode, said step B) includes:
   encoding one of the first preset masks into a first encoding index, said one of the first preset masks conforming with a first mask condition, in that the first pixel differences associated therewith and obtained in one of the repetitions of sub-step a-2) are not greater than the first threshold value, and having a smallest one of the first pixel differences relative to other ones of the first preset masks that conform with the first mask condition; and
   compressing the first pixel groups that are divided from the to-be-encoded image block by applying said one of the first preset masks associated with the first encoding index so as to obtain the encoded data.

6. The method as claimed in claim 1, wherein, in sub-step a-2), the first pixel difference is obtained using all of red component, green component, and blue component of each of the pixels of the to-be-encoded image block in an RGB color space.

7. The method as claimed in claim 1, wherein the first encoding mode is a uniform encoding mode, and sub-step A1) includes
   i) confirming whether or not at least a leftmost data bit of each of the pixels of the to-be-encoded image block are the same; and
   ii) determining the uniform encoding mode as being suitable to serve as the encoding mode when the confirmation made in step i) is affirmative.

8. The method as claimed in claim 7, wherein, when the encoding mode determined in step A) is the uniform encoding mode, said step B) includes:
   preserving complete data of one of the pixels of the to-be-encoded image block;
   preserving at least one bit next to said at least the leftmost data bit for each of the other pixels of the to-be-encoded image block; and
   compressing non-preserved data bits for each of the other pixels of the to-be-encoded image block.

9. The method as claimed in claim 7, wherein, in step A), the preset encoding modes further include a third encoding mode, said step A) further including
   A3) determining if the third encoding mode is suitable to serve as the encoding mode if it is determined in sub-step A2) that the second encoding mode is unsuited to serve as the encoding mode.

10. The method as claimed in claim 9, wherein, in step A), the preset encoding modes further include a fourth encoding mode, said step A) further including
    A4) determining the fourth encoding mode to serve as the encoding mode if it is determined in sub-step A3) that the third encoding mode is unsuited to serve as the encoding mode.

11. The method as claimed in claim 10, wherein the fourth encoding mode is a YUV encoding mode.

12. A method for image data compression of a to-be-encoded image block, comprising:
    A) determining, using a pre-detection module, one of a plurality of preset encoding modes as an encoding mode based upon attributes of pixels of the to-be-encoded image block; and
    B) compressing, using a compression processing module, image data of the to-be-encoded image block according to the encoding mode determined in step A) so as to obtain encoded data;

wherein:
in step A), the preset encoding modes include a first encoding mode and a second encoding mode, said step A) including:
A1) determining if the first encoding mode is suitable to serve as the encoding mode; and
A2) determining if the second encoding mode is suitable to serve as the encoding mode if it is determined in sub-step A1) that the first encoding mode is unsuited to serve as the encoding mode; and wherein one of the first encoding mode and the second encoding mode is a second edge encoding mode, and one of sub-steps A1) and A2) corresponding to the second edge encoding mode includes:
b-1) dividing the pixels of the to-be-encoded image block into three second pixel groups by applying one of a plurality of second preset masks, each of the second pixel groups including at least one of the pixels of the to-be-encoded image block;
b-2) obtaining at least one second pixel difference by:
obtaining an average pixel value of the pixels for each of the second pixel groups having at least two pixels;
calculating a second absolute difference between the average pixel value and each of the pixels for each of the second pixel groups having at least two pixels; and
obtaining the second pixel difference according to the second absolute differences obtained from each of the second pixel groups having at least two pixels;
b-3) repeating sub-steps b-1) and b-2) while applying another one of the second preset masks until all of the second preset masks have been applied; and
b-4) determining if the second edge encoding mode is suitable to serve as the encoding mode based on the second pixel differences obtained in sub-step b-2).

13. The method as claimed in claim 12, wherein, in sub-step b-4), the second edge encoding mode is determined to be suitable to serve as the encoding mode when each of the second pixel differences obtained in at least one of the repetitions of step b-2) is not greater than a second threshold value.

14. The method as claimed in claim 13, wherein, when the encoding mode determined in step A) is the second edge encoding mode, said step B) includes:
encoding one of the second preset masks into a second encoding index, said one of the second preset masks conforming with a second mask condition, in that the second pixel differences associated therewith and obtained in one of the repetitions of sub-step b-2) are not greater than the second threshold value, and having a smallest one of the second pixel differences relative to other ones of the second preset masks that conform with the second mask condition; and
compressing the second pixel groups that are divided from the to-be-encoded image block by applying said one of the second preset masks associated with the second encoding index so as to obtain the encoded data.

15. The method as claimed in claim 12, wherein, in sub-step b-2), the second pixel difference is obtained using all of red component, green component, and blue component of each of the pixels of the to-be-encoded image block in an RGB color space.

16. A method for image data compression of a to-be-encoded image block, comprising:
A) determining, using a pre-detection module, one of a plurality of preset encoding modes as an encoding mode based upon attributes of pixels of the to-be-encoded image block; and
B) compressing, using a compression processing module, image data of the to-be-encoded image block according to the encoding mode determined in step A) so as to obtain encoded data;
wherein:
in step A), the preset encoding modes include a first encoding mode and a second encoding mode, said step A) including:
A1) determining if the first encoding mode is suitable to serve as the encoding mode; and
A2) determining if the second encoding mode is suitable to serve as the encoding mode if it is determined in sub-step A1) that the first encoding mode is unsuited to serve as the encoding mode;
the first encoding mode is a uniform encoding mode, and sub-step A1) includes:
i) confirming whether or not at least a leftmost data bit of each of the pixels of the to-be-encoded image block are the same; and
ii) determining the uniform encoding mode as being suitable to serve as the encoding mode when the confirmation made in step i) is affirmative;
in step A), the preset encoding modes further include a third encoding mode, said step A) further including:
A3) determining if the third encoding mode is suitable to serve as the encoding mode if it is determined in sub-step A2) that the second encoding mode is unsuited to serve as the encoding mode; and
one of the second encoding mode and the third encoding mode is a first edge encoding mode, and one of sub-steps A2) and A3) corresponding to the first edge encoding mode includes:
a-1) dividing the pixels of the to-be-encoded image block into two first pixel groups by applying one of a plurality of first preset masks, each of the first pixel groups including at least one of the pixels of the to-be-encoded image block;
a-2) obtaining at least one first pixel difference by:
obtaining an average pixel value of the pixels for each of the first pixel groups having at least two pixels;
calculating a first absolute difference between the average pixel value and each of the pixels for each of the first pixel groups having at least two pixels; and
obtaining the first pixel difference according to the first absolute differences obtained from each of the first pixel groups having at least two pixels;
a-3) repeating sub-steps a-1) and a-2) while applying another one of the first preset masks until all of the first preset masks have been applied; and
a-4) determining if the first edge encoding mode is suitable to serve as the encoding mode based on the first pixel differences obtained in sub-step a-2).

17. A method for image data compression of a to-be-encoded image block, comprising:
A) determining, using a pre-detection module, one of a plurality of preset encoding modes as an encoding mode based upon attributes of pixels of the to-be-encoded image block; and
B) compressing, using a compression processing module, image data of the to-be-encoded image block according to the encoding mode determined in step A) so as to obtain encoded data;
wherein:
in step A), the preset encoding modes include a first encoding mode and a second encoding mode, said step A) including:

A1) determining if the first encoding mode is suitable to serve as the encoding mode; and A2) determining if the second encoding mode is suitable to serve as the encoding mode if it is determined in sub-step A1) that the first encoding mode is unsuited to serve as the encoding mode;

the first encoding mode is a uniform encoding mode, and sub-step A1) includes:

i) confirming whether or not at least a leftmost data bit of each of the pixels of the to-be-encoded image block are the same; and ii) determining the uniform encoding mode as being suitable to serve as the encoding mode when the confirmation made in step i) is affirmative;

in step A), the preset encoding modes further include a third encoding mode, said step A) further including:

A3) determining if the third encoding mode is suitable to serve as the encoding mode if it is determined in sub-step A2) that the second encoding mode is unsuited to serve as the encoding mode; and wherein one of the second encoding mode and the third encoding mode is a second edge encoding mode, and one of sub-steps A2) and A3) corresponding to the second edge encoding mode includes:

b-1) dividing the pixels of the to-be-encoded image block into three second pixel groups by applying one of a plurality of second preset masks, each of the second pixel groups including at least one of the pixels of the to-be-encoded image block;

b-2) obtaining at least one second pixel difference by:
obtaining an average pixel value of the pixels for each of the second pixel groups having at least two pixels;
calculating a second absolute difference between the average pixel value and each of the pixels for each of the second pixel groups having at least two pixels; and
obtaining the second pixel difference according to the second absolute differences obtained from each of the second pixel groups having at least two pixels;

b-3) repeating sub-steps b-1) and b-2) while applying another one of the second preset masks until all of the second preset masks have been applied; and b-4) determining if the second edge encoding mode is suitable to serve as the encoding mode based on the second pixel differences obtained in sub-step b-2).

* * * * *